July 2, 1963
C. R. STELLJES ETAL
3,095,748
ORBITAL MOTION TOOL
Filed June 16, 1961
3 Sheets-Sheet 1
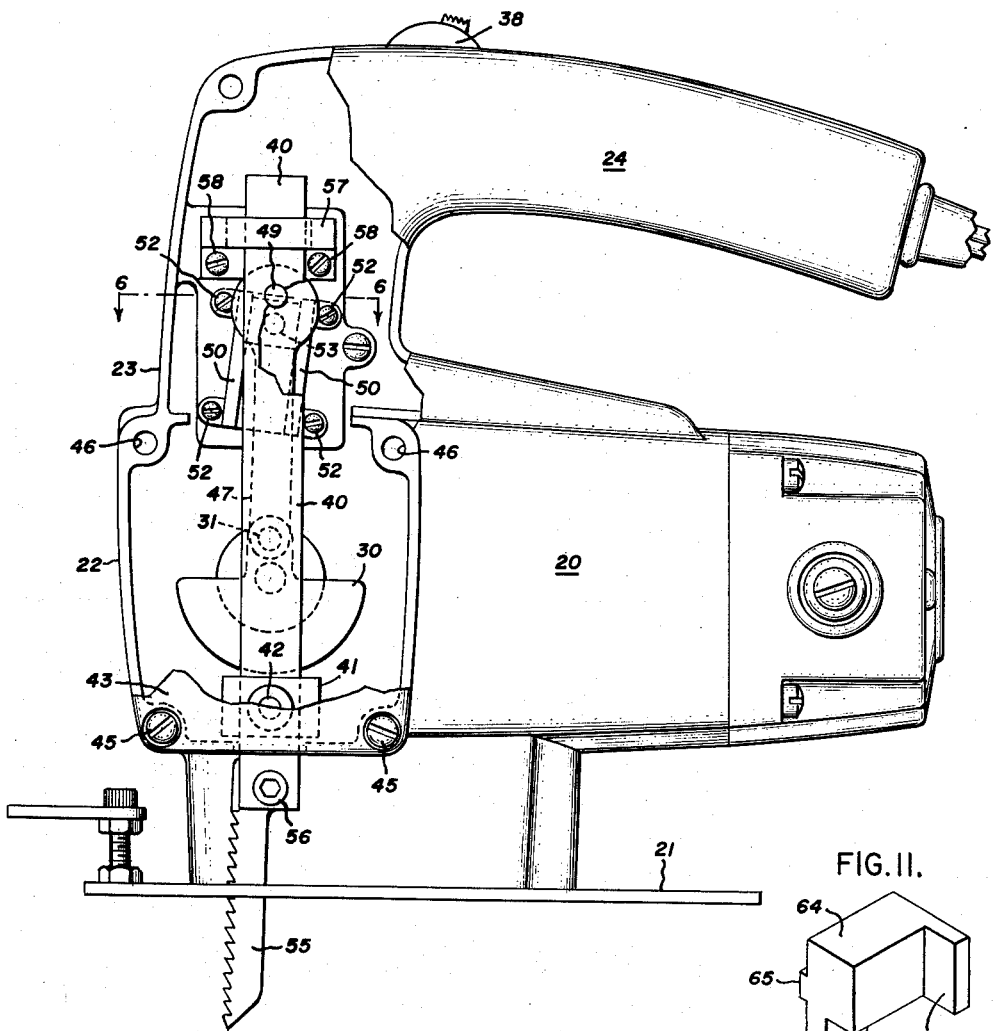
FIG. I.
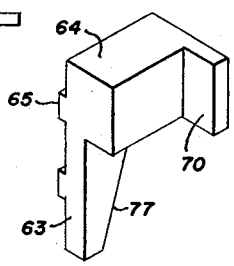
FIG. II.
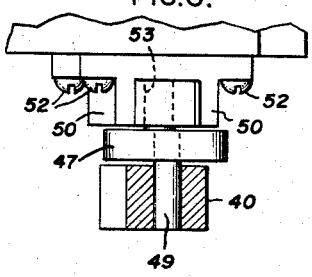
FIG. 6.
INVENTORS:
CHARLES R. STELLJES,
LARS FROSTAD,
HUGH K. LEACH,
BY *A. Emmett Thompson*
THEIR ATTORNEY July 2, 1963

C. R. STELLJES ETAL 3,095,748

ORBITAL MOTION TOOL

Filed June 16, 1961

INVENTORS:
CHARLES R. STELLJES,
LARS FROSTAD,
HUGH K. LEACH,

BY *Q. Emmett Thompson*

THEIR ATTORNEY.

July 2, 1963  C. R. STELLJES ETAL  3,095,748
ORBITAL MOTION TOOL
Filed June 16, 1961  3 Sheets-Sheet 3
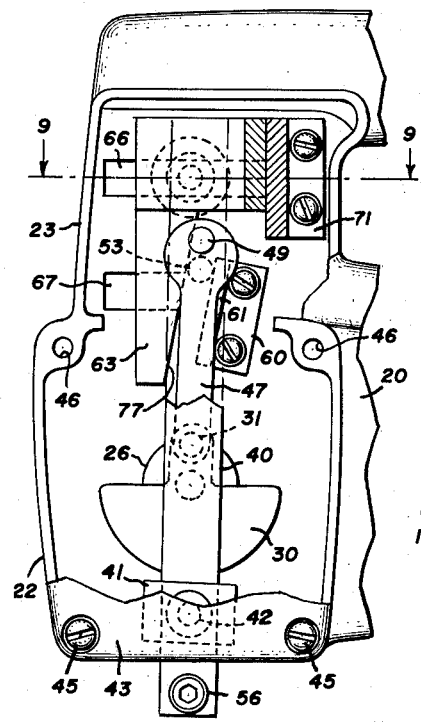
FIG.5.
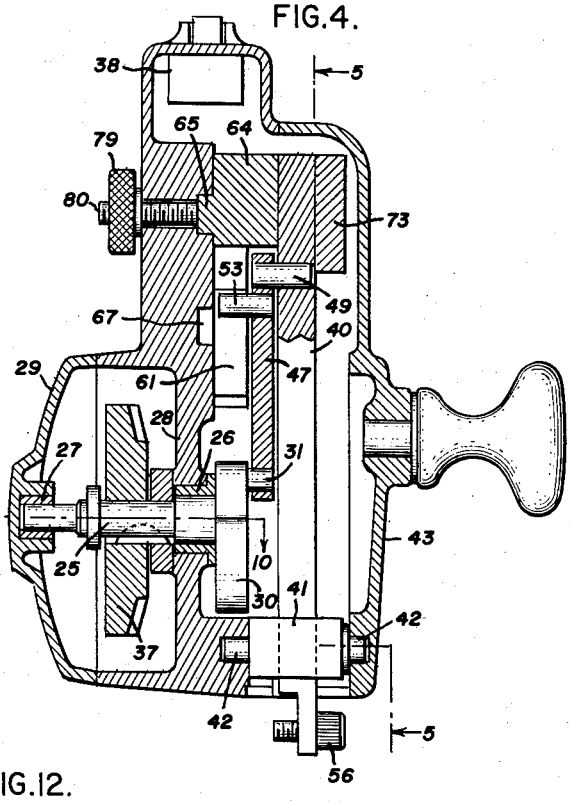
FIG.4.
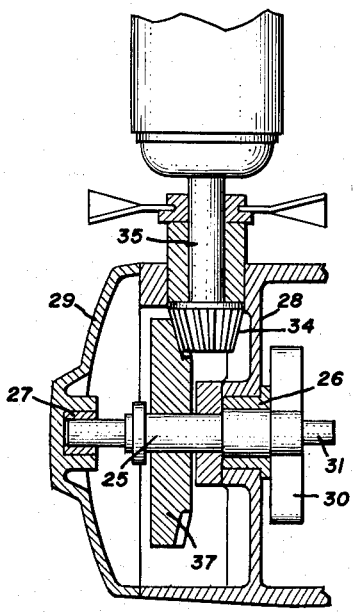
FIG.10.
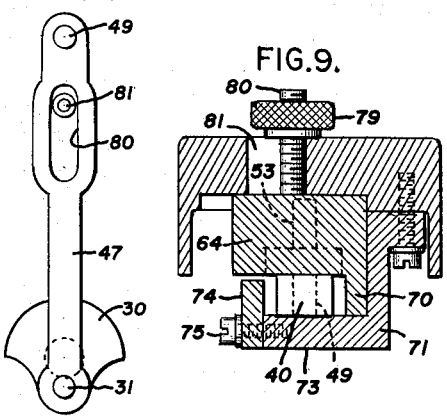
FIG.12.
FIG.9.
INVENTORS:
CHARLES R. STELLJES,
LARS FROSTAD,
HUGH K. LEACH,
BY *D. Emmett Thompson*
THEIR ATTORNEY.

United States Patent Office 3,095,748
Patented July 2, 1963

3,095,748
ORBITAL MOTION TOOL
Charles R. Stelljes, Fayetteville, and Lars Frostad and Hugh K. Leach, Syracuse, N.Y., assignors to The Porter-Cable Machine Company, Syracuse, N.Y., a corporation of Delaware
Filed June 16, 1961, Ser. No. 117,690
9 Claims. (Cl. 74—44)

This invention relates to power-operated, orbital motion tools, such as sanding machines, bayonet saws, and the like.

The invention has as an object an orbital motion tool embodying an improved structural arrangement for effecting the orbital motion of the tool, which structure is particularly simple and economical to manufacture, and which provides particularly strong and efficient support for the tool, and which will function over long periods of time without requiring maintenance.

The invention has as a further object an orbital motion tool embodying the structural arrangement having all of the above-mentioned advantages and which can be quickly and conveniently adjusted to change the movement of the tool from orbital motion to straight line motion.

The invention consists in the novel features and in the combinations and constructions hereinafter set forth and claimed.

In describing this invention, reference is had to the accompanying drawings in which like characters designate corresponding parts in all the views.

In the drawings:

FIGURE 1 is a side elevational view of a saber saw in which our invention is incorporated, with parts broken away.

FIGURE 4 is a vertical sectional view taken on line 4—4, FIGURE 2.

FIGURE 5 is a view taken on line 5—5, FIGURE 4.

FIGURE 6 is an enlarged fragmentary view taken on line 6—6, FIGURE 1.

FIGURE 9 is a view, similar to FIGURE 8, taken on line 9—9, FIGURE 5.

FIGURE 10 is a view taken on a line corresponding to line 10—10, FIGURE 4.

FIGURE 11 is a perspective view of the adjustable carrier and connecting rod guide member.

FIGURE 12 is a side elevational view of a modified form of connecting rod and guide.

Figure 7:
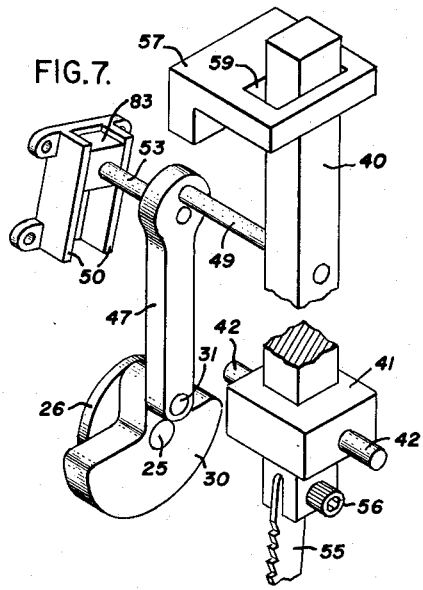
FIGURE 7 is a diagrammatic view of the structure imparting orbital movement to the tool carrier.

Referring to the drawings, the invention is illustrated as embodied in a hand-manipulated saber saw comprising a housing 20 mounted on a base plate 21. The main portion of the housing 20 is more or less of cylindrical formation, and the forward portion 22 is of generally rectangular formation having an upwardly extending portion 23, to the upper end of which is affixed a manipulating handle 24. A crank shaft 25 is journalled transversely of the housing in bearings 26, 27, the bearing 26 being mounted in a wall 28, and the bearing 27 in a cap 29 detachably secured to the housing. A crank is affixed to one end of the shaft 25, here shown in the form of a disk 30 having a crank pin 31. A motor is mounted in the housing 20. A bevel pinion 34 is mounted on the armature shaft 35 of the motor, see FIGURE 10. The pinion 34 is arranged in mesh with a bevel gear 37 keyed to the crank shaft 25 to effect rotation thereof when power is supplied to the motor through a switch 38. This general arrangement is conventional in machines of this type.

A tool carrier is mounted in the housing for orbital movement. In the saw structure disclosed, the tool carrier consists of a metallic bar 40, rectangular in cross section, and being slidably mounted in a guide 41 provided with trunnions 42 journalled in the forward portion 22 of the housing, and in a cap 43 detachably secured to the left side face of the housing portion 22, as by screws 45 threading in apertures 46 formed in the housing. With this arrangement, the guide 40 is mounted for oscillation in the housing about an axis extending parallel to the axis of the crank shaft 25. The tool carrier 40 is mounted for vertical sliding movement in the guide 41. A connecting rod 47 is pivotally connected at one end on the crank pin 31, and at its opposite end is pivotally connected to the tool carrier 40 by a pin 49. It will be apparent that upon rotation of the crank 31, the tool carrier 40 is reciprocated in the guide 41. Obviously the crank may be in the form of an eccentric.

There is mounted in the housing, against movement relative thereto, a connecting rod guide member. This guide member, in FIGURES 1, 6 and 7, is in the form of a U-shaped block having parallel spaced apart walls 50, the block being fixed to the housing, as by screws 52. A pin 53 is mounted in the connecting rod in close adjacency to the pin 49, this pin 49 having linear slidable and pivotal connection with the walls 50 of the guide block to thereby provide such connection between the connecting rod and guide. It will be apparent, upon rotation of the crank shaft, that as the lower end of the connecting rod is moved laterally of the axis of the crank shaft, the upper end portion of the connecting rod, carrying the pin 49, is moved laterally in the opposite direction. Upon movement of the crank pin 31 through an arc of 180°, the lower end of the connecting rod is moved laterally in the opposite direction and in like manner, the upper end of the rod with the pin 49 is moved laterally in the opposite direction, these lateral movements obviously taking place simultaneously with the vertical reciprocation of the tool carrier 40. This lateral movement of the upper end of the tool carrier is permitted because of the oscillating mount of the lower guide 41 by means of the trunnions 42.

The reciprocating and lateral movements of the tool carrier result in the carrier and tool moving in an orbital path. Preferably and to provide additional stability to the carrier, an upper tool carrier guide 57 is provided in the form of an angle piece fixed to the housing, as by screws 58. The outward extending flange of the guide piece is formed with a rectangular opening 59, the side walls of which have sliding engagement with the inner and outer side surfaces of the carrier 40. The ends of the walls of the opening 59 are spaced apart to permit the lateral movement of the carrier during its orbital motion.

The degree of lateral movement, and the configuration of the orbital path traveled by the tool or saw 55 secured to the lower end of the carrier 40, as by screw 56, is determined by the spacing between the pins 49, 53, in a direction lengthwise of the connecting rod and relative to the spacing between those pins and the crank pin 31.

It has been long since determined that these bayonet saws are much more effective in cutting fibrous material, such as wood, if an orbital movement is imparted to the saw blade. It has also been determined that the cutting action is improved if the orbit is slightly inclined, rather than vertical. Accordingly, the connecting rod guide block 50 is preferably mounted at a slight angle to the vertical, as illustrated in FIGURES 1 and 7.

This arrangement for effecting orbital movement of the tool carrier permits a particularly rugged mounting for the carrier. It will be observed that the major portion of the pressure, effected by pushing the saw forwardly in the work, is taken by the guide block 41, which is of substantial dimension and mounted for oscillation upon the relatively heavy trunnions 42. The pin 49, providing the connection between the connecting rod and tool carrier 40, is spaced an appreciable distance from the guide block 41, effecting a substantial lever advantage during the cutting operation, all whereby wear of the moving parts of the machine is reduced to a minimum, the machine operating for a substantial period of time without the moving parts loosening up perceptively, as is the case in orbital motion bayonet saws now in use.

It has also been determined that in cutting harder material, such as metal, a straight line reciprocating action is more efficient than the orbital action. In FIGURES 2, 3, 4, 5, 8 and 9, for example, we have disclosed a modified structure in regard to the connecting rod guide mechanism. In this arrangement, an angle member 60 is fixedly secured in the housing, and has a linear flange 61 comparable to a side 50 of the connecting rod guide member previously described. The opposite or cooperating portion of the guide is in the form of an arm 63 depending from a block 64 formed with a rib 65 slidably mounted in a slot 66 formed on the inner surface of the housing. The depending arm portion 63 is also formed with a similar rib slidably mounted in a lower slot 67 extending parallel to the slot 66. This block 64 has an outwardly extending flange 70. The block 64 serves as a guide for the inner side surface of the tool carrier 40, and the flange 70 serves as a guide for the rear side surface of the tool carrier when the block is positioned as hereinafter described.

An L-shaped bracket 71 is secured in the housing, as by screws 72. This bracket has a leg 73 overlying the outer face of the tool carrier 40, and there is a plate 74 affixed to the free edge of the leg 73, as by screws 75. The plate 74 overlies the forward side surface of the tool carrier 40.

Figure 2:
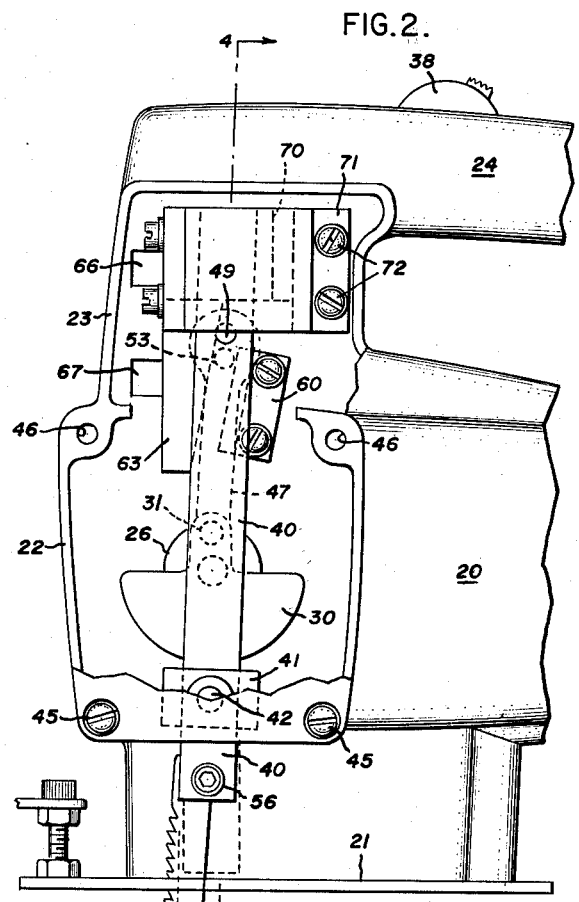
FIGURE 2 is a view, similar to FIGURE 1, of the forward portion of the machine illustrating a modification in the mechanism for producing the orbital motion and which may be adjusted to effect a straight line motion of the tool, the parts being adjusted in this figure to effect the orbital motion.

The depending arm portion 63 is formed with an inclined surface 77 confronting the guide piece 60 in spaced parallel relation thereto, and forming, in conjunction therewith, a guide slot for the pin 49, when the block 64 is moved to the right, FIGURES 2, 5 and 9, with the flange 70 against the bracket 71. The block is locked in this position by tightening a thumb nut 79 threaded on a stud 80 secured to the block 64 and extending through a slot 81 in the housing. With the block 64 in this position, the upper end of the tool carrier 40 functions out of engagement with the flange 70 of the block and the guide plate 74, see FIGURE 9, permitting orbital movement of the tool carrier, as previously explained.

Figure 3:
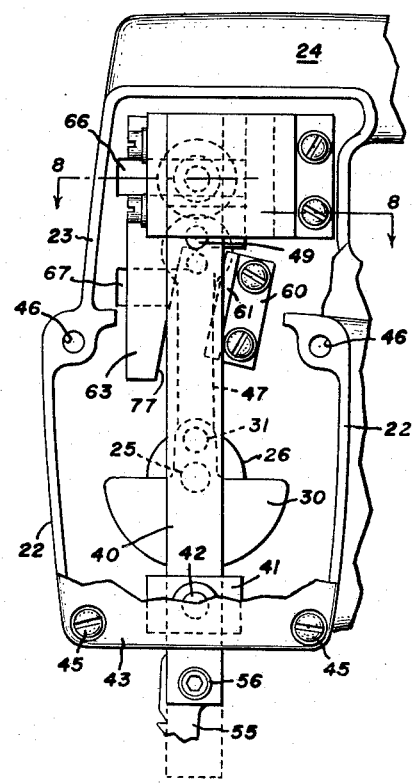
FIGURE 3 is a view similar to FIGURE 2, with the mechanism adjusted to effect straight line movement of the tool.
Figure 8:
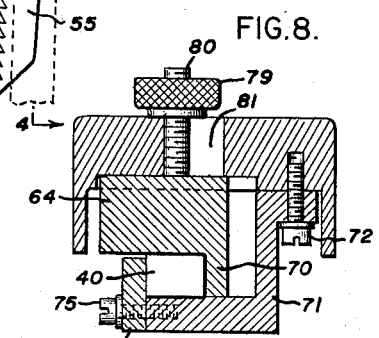
FIGURE 8 is a view taken on line 8—8, FIGURE 3.

When it is desired to impart straight line linear movement to the tool carrier, the nut 79 is loosened and the block moved to the left, as shown in FIGURES 3 and 8. This movement shifts the inclined surface 77 of the depending arm portion 63 away from the fixed portion 60 of the guide for the pin 49, and moves the flange 70 against the carrier 40, moving the carrier 40 against the plate 74. This provides an upper fixed guide for the upper portion of the tool carrier and which, in combination with the lower guide 41, provides for straight line reciprocation of the tool carrier which is effected because then the pin 49 is no longer moving in engagement with the guide 60, 63. Accordingly, this structure provides for the quick and convenient change from orbital to straight line movement for the tool carrier, and vice versa.

In FIGURE 12, the connecting rod is formed with a lengthwise extending slot 80, and the guide is in the form of a pin 81 fixedly secured in the wall 28 of the housing. It will be apparent that this pin and slot arrangement provides for the linear, slidable and pivotal movement between the connecting rod and the guide member, and is satisfactory in the form not providing for conversion of the tool carrier from orbital to pivotal movement. The pin 81 may be provided with a suitable anti-friction bearing, and the connecting rod guide pin 53 may be provided with a block 83, as shown in FIGURE 7, to provide a better wear surface between the pin and the fixed guide.

What we claim is:

1. An orbital motion, power-operated tool comprising a housing, a crank shaft journalled in said housing, a motor mounted in said housing and operatively connected to said shaft to effect rotation thereof, a crank affixed to said shaft, a tool carrier mounted for orbital movement in said housing in a plane normal to the axis of said crank, a connecting rod pivotally attached to said crank, a guide member mounted in the housing in spaced relation to said shaft in a direction lengthwise of said connecting rod, means for restraining movement of said guide member relative to said housing, said connecting rod having linear sliding and pivotal connection with said guide, and means pivotally connecting said connecting rod to said tool carrier, said latter connection being spaced in a direction lengthwise of said connecting rod from said first connection.

2. An orbital motion, power-operated tool comprising a housing, a crank shaft journalled in said housing, a motor mounted in said housing and operatively connected to said shaft to effect rotation thereof, a tool carrier mounted for orbital movement in said housing in a plane normal to the axis of said crank shaft, a connecting rod attached at one end to said crank, a guide member mounted in said housing in spaced relation to said shaft in a direction lengthwise of said connecting rod, means for restraining movement of said guide member relative to said housing, said connecting rod having linear sliding and pivotal connection with said guide, and means pivotally connecting said connecting rod to said tool carrier, said latter connection being spaced in a direction lengthwise of said connecting rod from said first connection.

3. An orbital motion, power-operated tool comprising a housing, a crank shaft journalled in said housing, a motor mounted in said housing and being operatively connected to said crank shaft to effect rotation thereof, a crank affixed to said shaft, a tool carrier mounted for orbital movement in said housing in a plane normal to the axis of said countershaft, a connecting rod connected at one end to said crank and at its opposite end to said carrier, a connecting rod guide member mounted in said housing against movement relatively thereto and in spaced relation to said crank shaft in a direction lengthwise of said connecting rod, said connecting rod having linear, sliding and pivotal connection intermediate its ends with said guide member.

4. An orbital motion, power-operated tool comprising a housing, a crank shaft journalled in said housing, a motor mounted in said housing and operatively connected to said crank shaft to effect rotation thereof, a tool carrier guide mounted in said housing at one side of said crank shaft for oscillation about an axis extending parallel to said crank shaft, a tool carrier slidably mounted in said guide for movement in a plane normal to the axis of said crank shaft, and having a portion extending on the opposite side of said crank shaft, a connecting rod pivotally connected at one end to said crank and being pivotally connected at its opposite end to said extending portion of said tool carrier, a connecting rod guide member mounted in said housing, means for restraining movement of said guide member relative to the housing, said connecting rod having linear sliding and pivotal connection intermediate its ends with said guide member.

5. An orbital motion, power-operated saber saw comprising a housing, a tool carrier guide mounted in the housing for oscillation about a fixed axis, a crank shaft journalled in the housing for rotation about an axis extending in spaced parallel relation to the axis of said guide, a crank fixed to said crank shaft, a motor mounted in said housing and operatively connected to said crank shaft to effect rotation thereof, a tool carrier mounted for sliding movement in said guide and having an end portion extending through said housing and having means for attaching a saw blade thereto, the opposite end portion of said carrier extending past the axis of said crank shaft, a connecting rod connected at one end to said crank and at its opposite end connected to said opposite end portion of said carrier, a connecting rod guide means fixed to the housing, said connecting rod having sliding and pivotal connection intermediate its ends with said connecting rod guide means, whereby said carrier and saw blade are caused to move in an orbital path upon rotation of said crank shaft.

6. An orbital motion, power-operated tool comprising a housing, a crank shaft journalled in said housing, a motor mounted in said housing and operatively connected to said shaft to effect rotation thereof, a crank affixed to said shaft, a tool carrier mounted for orbital movement in said housing in a plane normal to the axis of said crank shaft, a connecting rod guide member mounted in the housing in radial spaced relation to said crank shaft in a direction generally lengthwise of said connecting rod, said connecting rod having engagement with said guide for linear, sliding and pivotal movement relative to the guide, means pivotally connecting said connecting rod to said tool carrier, said latter connection being spaced in a direction lengthwise of said connecting rod from the engagement of said rod with said guide, and means co-operable with said guide member to move the same out of engagement with said connecting rod.

7. An orbital motion, power-operated tool comprising a housing, a crank shaft journalled in said housing, a motor mounted in said housing and operatively connected to said shaft to effect rotation thereof, a crank affixed to said shaft, a tool carrier mounted for orbital movement in said housing in a plane normal to the axis of said crank shaft, a connecting rod pivotally attached to said crank, a guide member mounted in the housing in spaced relation to said shaft in a direction generally lengthwise of said connecting rod, means co-operable with said guide member for detachably securing the same to said housing, said connecting rod having linear sliding and pivotal connection with said guide, and means pivotally connecting said connecting rod to said tool carrier, said latter connection being spaced in a direction lengthwise of said connecting rod from said first connection.

8. An orbital motion, power-operated tool comprising a housing, a crank shaft journalled in said housing, a motor mounted in said housing and operatively connected to said crank shaft to effect rotation thereof, and a crank affixed to said shaft, a carrier guide member mounted in the housing in radial spaced relation to said crank shaft for oscillation about an axis extending parallel with the axis of said crank shaft, a tool carrier, said carrier having a portion slidably mounted in said guide member, a connecting rod guide member mounted in said housing in spaced relation to said crank shaft in a direction generally lengthwise of said connecting rod, said connecting rod guide member being movable into and out of connecting rod guiding position, said connecting rod having linear sliding and pivotal engagement with said guide when the latter is in the guiding position, a second carrier guide member mounted in the housing in spaced relation to said first carrier guide member in a direction lengthwise of said connecting rod and being movable into and out of guiding relation with said carrier, and means co-operable with said connecting rod guide member and said second carrier guide to simultaneously effect movement of said connecting rod guide member into guiding position and for moving said second carrier guide out of guiding relation with said carrier.

9. An orbital motion, power operated tool comprising a housing, a crank shaft journalled in said housing, a motor mounted in said housing and being operatively connected to said crank shaft to effect rotation thereof, a crank affixed to said shaft, a tool carrier, a connecting rod connected to said crank and said carrier for effecting reciprocation of the carrier upon rotation of the crank shaft, a carrier guide member mounted in the housing in spaced relation to said crank shaft for oscillation about an axis extending parallel to said crank shaft, said carrier having a portion slidably mounted in said guide member, a second carrier guide member mounted in the housing in spaced relation to said first carrier guide member in a direction lengthwise of said connecting rod and being movable into and out of guiding relation with said carrier, a connecting rod guide member mounted in said housing in spaced relation to said crank shaft in a direction lengthwise of said connecting rod, said connecting rod guide member being movable into and out of guiding relation with said connecting rod, said connecting rod having linear, sliding and pivotal engagement with said connecting rod guide member when the latter is in guiding relation, means common to said connecting rod guide and said second carrier guide, and operable upon movement of one of said guides into guiding relation to move said other guide out of guiding position.

References Cited in the file of this patent
UNITED STATES PATENTS

| | | |
|---|---|---|
| 2,737,984 | Bruck | Mar. 13, 1956 |
| 2,966,178 | Katzfey | Dec. 27, 1960 |